(12) United States Patent
Park (10) Patent No.: US 12,550,939 B2
(45) Date of Patent: Feb. 17, 2026

(54) AEROSOL GENERATING DEVICE AND AEROSOL GENERATING SYSTEM

(71) Applicant: KT&G CORPORATION, Daejeon (KR)

(72) Inventor: Sang Kyu Park, Seoul (KR)

(73) Assignee: KT&G Corporation, Daejeon (KR)

( * ) Notice: Subject to any disclaimer, the term of this patent is extended or adjusted under 35 U.S.C. 154(b) by 865 days.

(21) Appl. No.: 17/792,333

(22) PCT Filed: Aug. 17, 2021

(86) PCT No.: PCT/KR2021/010862
§ 371 (c)(1),
(2) Date: Jul. 12, 2022

(87) PCT Pub. No.: WO2022/059931
PCT Pub. Date: Mar. 24, 2022

(65) Prior Publication Data
US 2023/0055109 A1    Feb. 23, 2023

(30) Foreign Application Priority Data

Sep. 16, 2020   (KR) .......................... 10-2020-0119328

(51) Int. Cl.
*A24F 40/465* (2020.01)
*A24F 40/51* (2020.01)
*A24F 40/57* (2020.01)

(52) U.S. Cl.
CPC ............ *A24F 40/465* (2020.01); *A24F 40/51* (2020.01); *A24F 40/57* (2020.01)

(58) Field of Classification Search
None
See application file for complete search history.

(56) References Cited

U.S. PATENT DOCUMENTS

| 7,275,865 B2 | 10/2007 | Kim et al. |
| 2016/0150825 A1 | 6/2016 | Mironov et al. |
| 2020/0046020 A1 | 2/2020 | Cross |

(Continued)

FOREIGN PATENT DOCUMENTS

| CA | 2 651 837 A1 | 11/2007 |
| CN | 110403241 A | 11/2019 |

(Continued)

OTHER PUBLICATIONS

English machine translation of CN 111972723 A to Huang; published Nov. 24, 2020; 18 pages. (Year: 2020).*

(Continued)

*Primary Examiner* — Linda L Gray
(74) *Attorney, Agent, or Firm* — Foley & Lardner LLP (57) ABSTRACT

An aerosol-generating device includes a susceptor arranged to be inserted into an aerosol-generating substrate, a coil configured to heat the susceptor by induction heating, a magnetic force detector configured to detect a change in magnetic force of the susceptor according to a temperature change, and a controller configured to calculate a temperature of the susceptor based on the change of the magnetic force detected by the magnetic force detector. Accordingly, the aerosol-generating device accurately measures the temperature of the susceptor in a non-contact manner.

7 Claims, 6 Drawing Sheets

(56) References Cited

U.S. PATENT DOCUMENTS

| | | |
|---|---|---|
| 2020/0054068 A1 | 2/2020 | Blandino et al. |
| 2020/0100540 A1* | 4/2020 | Qiu .................. A24F 40/50 |
| 2020/0138105 A1 | 5/2020 | Rossoll et al. |
| 2020/0214355 A1 | 7/2020 | Lee et al. |
| 2021/0059306 A1 | 3/2021 | Chen et al. |
| 2021/0084980 A1 | 3/2021 | Lee et al. |
| 2021/0093009 A1 | 4/2021 | Park et al. |
| 2021/0120875 A1 | 4/2021 | Mironov |
| 2023/0096283 A1 | 3/2023 | Courbat et al. |

FOREIGN PATENT DOCUMENTS

| | | | |
|---|---|---|---|
| CN | 110461177 A | 11/2019 | |
| CN | 110891443 A | 3/2020 | |
| CN | 111109662 A | 5/2020 | |
| CN | 111631432 A | 9/2020 | |
| KR | 10-0601956 B1 | 7/2006 | |
| KR | 10-2019-0035949 A | 4/2019 | |
| KR | 10-2019-0051789 A | 5/2019 | |
| KR | 10-2019-0118199 A | 10/2019 | |
| KR | 10-2020-0038050 A | 4/2020 | |
| KR | 10-2020-0069904 A | 6/2020 | |
| KR | 10-2020-0078410 A | 7/2020 | |
| WO | 2018/092040 A1 | 5/2018 | |
| WO | 2018/178113 A2 | 10/2018 | |
| WO | 2020/122428 A1 | 6/2020 | |
| WO | 2020/130752 A1 | 6/2020 | |
| WO | WO-2020166950 A2 * | 8/2020 | ............. A23L 33/15 |

OTHER PUBLICATIONS

English machine translation of CN 210407107 to Fang published Apr. 28, 2020; 31 pages. (Year: 2020).*

English machine translation of JP 2019535283; published Dec. 12, 2019; 52 pages. (Year: 2019).*

English machine translation of CN 113017149 A to Li published Jun. 25, 2021; 32 pages. (Year: 2021).*

English machine translation of TW 201545674 A to Mironov published Dec. 16, 2015; 73 pages. (Year: 2015).*

English machine translation of KR 102224748 published Mar. 8, 2021; 28 pages. (Year: 2021).*

English machine translation of KR 20190051789 A to Lee published May 15, 2019; 43 pages. (Year: 2019).*

Office Action issued Jun. 28, 2022 in Korean Application No. 10-2020-0119328.

Chinese Office Action on Patent Application No. 202180015729.4 dated Mar. 28, 2025.

Extended European Search Report issued Jul. 14, 2023 in Application No. 21869554.2.

International Search Report for PCT/KR2021/010862 dated Dec. 17, 2021 [PCT/ISA/210].

Written Opinion for PCT/KR2021/010862 dated Dec. 17, 2021 [PCT/ISA/237].

Korean Office Action for KR 10-2020-0119328 dated Sep. 16, 2020.

* cited by examiner

AEROSOL GENERATING DEVICE AND AEROSOL GENERATING SYSTEM

TECHNICAL FIELD

The present disclosure relates to an aerosol-generating device and an aerosol-generating system, and more particularly, to an aerosol-generating device capable of measuring a temperature of a heater by a non-contact method.

BACKGROUND ART

Recently, demand for alternative methods for overcoming the shortcomings of general cigarettes is increasing. For example, there is growing demand for an aerosol-generating device that generates aerosols by heating a cigarette or an aerosol-generating material in a liquid storage, instead of combusting a cigarette.

In particular, methods have been proposed which are different from a method of arranging a heater including an electric resistor inside or outside a cigarette accommodated in an aerosol-generating device and heating the cigarette by supplying power to the heater. In particular, methods of heating a cigarette by an induction heating method have been actively researched.

According to an induction heating method, a temperature sensor may be directly attached to the inside or outside of a susceptor, and thus, a temperature of the susceptor may be measured. However, in this case, the temperature sensor is in contact with the susceptor, and thus, the temperature sensor may be likely to be damaged because of the heat. Also, the power efficiency of the contact temperature detecting method is lower than that of a non-contact temperature detecting method.

DISCLOSURE OF INVENTION

Technical Problem

The existing non-contact temperature detection method using Curie temperature may not be produce consistent results, because the performance of the temperature sensor depends on physical properties of the susceptor. Also, since a temperature of the susceptor is inferred from the ambient temperature of the susceptor, and the detection of a temperature may be inaccurate and slow.

The technical problems of the present disclosure are not limited to the above-described description, and other technical problems may be derived from the embodiments to be described hereinafter.

Solution to Problem

According to an aspect of the present disclosure, an aerosol-generating device includes a susceptor arranged to be inserted into an aerosol-generating substrate, a coil configured to heat the susceptor, a magnetic force detector configured to detect a change in magnetic force of the susceptor according to a temperature change, and a controller configured to calculate a temperature of the susceptor based on the change in the magnetic force detected by the magnetic force detector.

According to another aspect of the present disclosure, an aerosol-generating device includes a susceptor arranged to be inserted into an aerosol-generating substrate, a coil unit comprising a first coil configured to heat the susceptor by induction heating, and a second coil configured to induce magnetism to the susceptor, a magnetic force detector configured to detect a change in magnetic force of the susceptor according to a temperature change, and a controller configured to calculate a temperature of the susceptor based on the change in the magnetic force detected by the magnetic force detector.

According to another aspect of the present disclosure, an aerosol-generating device includes a susceptor arranged to be inserted into an aerosol-generating substrate, a coil configured to heat the susceptor by induction heating and induce magnetism to the susceptor, a magnetic force detector configured to detect a change in magnetic force of the susceptor according to a temperature change, and a controller configured to calculate a temperature of the susceptor based on the change in the magnetic force detected by the magnetic force detector.

According to another aspect of the present disclosure, provided is an aerosol-generating system including an aerosol-generating substrate and an aerosol-generating device, the aerosol-generating substrate including a susceptor. The aerosol-generating device is configured to heat the susceptor by induction heating, detect a change in magnetic force of the susceptor according to a temperature change, and calculate a temperature of the susceptor based on the change in the magnetic force.

Advantageous Effects of Invention

Since an aerosol-generating device of the present disclosure measures a temperature of a susceptor in a non-contact manner, a temperature sensor may be much less likely damaged than a temperature detecting method in a contact manner.

Also, since the aerosol-generating device measures the temperature of the susceptor in the non-contact manner, power efficiency in the non-contact manner significantly increases compared to that in a contact manner.

Also, the aerosol-generating device measures the temperature of the susceptor based on a change in magnetic force of the susceptor, regardless of a Curie temperature of the susceptor, the temperature may be measured accurately.

In addition, the aerosol-generating device measures the temperature of the susceptor based on the change in the magnetic force of the susceptor, not based on an ambient temperature of the susceptor. Thus, the temperature may be accurately measured.

However, effects of the present disclosure are not limited to the above effects, and effects that are not mentioned could be clearly understood by one of ordinary skill in the art from the present specification and the attached drawings.

BEST MODE FOR CARRYING OUT THE INVENTION

According to an aspect of the present disclosure, an aerosol-generating device includes a susceptor arranged to be inserted into an aerosol-generating substrate; a coil configured to heat the susceptor by induction heating; a magnetic force detector configured to detect a change in magnetic force of the susceptor according to a temperature change; and a controller configured to calculate a temperature of the susceptor based on the change in the magnetic force detected by the magnetic force detector.

The susceptor may include a permanent magnet material and protrude in an accommodation space in which the aerosol-generating substrate is accommodated.

The coil may surround an accommodation space in which the aerosol-generating substrate is accommodated and may be wound to extend in a lengthwise direction of the accommodation space.

According to another aspect of the present disclosure, an aerosol-generating device includes a susceptor arranged to be inserted into an aerosol-generating substrate; a coil unit comprising a first coil configured to heat the susceptor by induction heating, and a second coil configured to induce magnetism in the susceptor; a magnetic force detector configured to detect a change in magnetic force of the susceptor according to a temperature change; and a controller configured to calculate a temperature of the susceptor based on the change in the magnetic force detected by the magnetic force detector.

The controller may be configured to control the first coil and the second coil in a preset control period, and the preset control period may include a first section, in which the susceptor is heated, and a second section, in which magnetism is induced in the susceptor.

The controller may be configured to calculate a temperature of the susceptor based on a change in a magnetic force of the susceptor detected by the magnetic force detector in the second section.

The susceptor may protrude in the accommodation space in which the aerosol-generating substrate is accommodated, and the first coil and the second coil may surround the accommodation space.

The first coil and the second coil may be alternately wound in a lengthwise direction of the accommodation space.

The first coil may be wound around a first area of the accommodation space, and the second coil may be wound around a second area of the accommodation space which is different from the first area.

According to another aspect of the present disclosure, an aerosol-generating device includes a susceptor arranged to be inserted into an aerosol-generating substrate; a coil configured to heat the susceptor by induction heating and induce magnetism in the susceptor; a magnetic force detector configured to detect a change in magnetic force of the susceptor according to a temperature change; and a controller configured to calculate a temperature of the susceptor based on the change in the magnetic force detected by the magnetic force detector.

The controller may be configured to control the coil in a preset control period, and the preset control period may include a first section in which the susceptor is heated, and a second section in which the magnetism is induced in the susceptor.

The controller may be configured to calculate the temperature of the susceptor based on the change in the magnetic force detected by the magnetic force detector in the second section.

The susceptor may protrude in the accommodation space in which the aerosol-generating substrate is accommodated, and the coil may surround the accommodation space.

According to another aspect of the present disclosure, provided is an aerosol-generating system including an aerosol-generating substrate and an aerosol-generating device, the aerosol-generating substrate including a susceptor. The aerosol-generating device is configured to heat the susceptor by induction heating, detect a change in magnetic force of the susceptor according to a temperature change, and calculate a temperature of the susceptor based on the change in the magnetic force.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function and/or operation and can be implemented by hardware components or software components and combinations thereof.

While such terms as "first," "second," etc., may be used to describe various components, such components must not be limited to the above terms. The above terms are used only to distinguish one component from another.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term "aerosol generating substrate" may refer to any article that is designed for smoking by a person puffing on the aerosol generating substrate. The aerosol generating substrate may include an aerosol generating material that generates aerosols when heated even without combustion. For example, one or more aerosol generating substrates may be loaded in an aerosol generating device and generate aerosols when heated by the aerosol generating device. The shape, size, material, and structure of the aerosol generating substrate may differ according to embodiments. Examples of the aerosol generating substrate may include, but are not limited to, a cigarette-shaped substrate and a cartridge. Hereinafter, the term "cigarette" (i.e., when used alone without a modifier such as "general," "traditional," or "combustive") may refer to an aerosol generating substrate which has a shape and a size similar to those of a traditional combustive cigarette.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Hereinafter, embodiments of the present disclosure will be described in detail with reference to the drawings.

Figure 1:
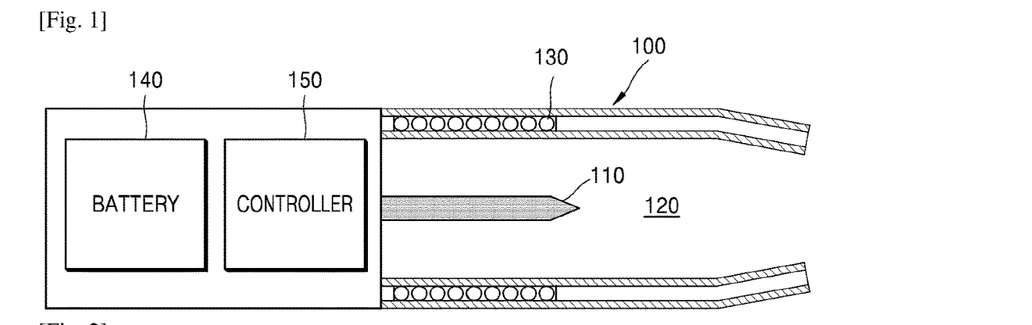
FIGS. 1 and 2 are diagrams illustrating an aerosol-generating device using an induction heating method.
Figure 2:
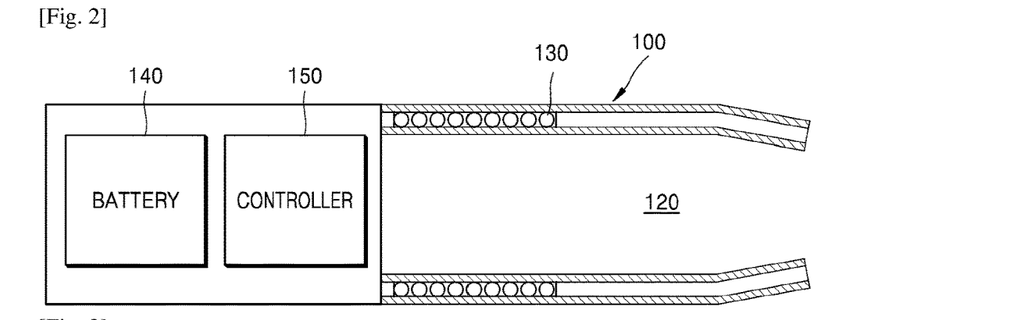

FIGS. 1 and 2 are diagrams illustrating an aerosol-generating device using an induction heating method.

Referring to FIG. 1, the aerosol-generating device 100 may include a susceptor 110, an accommodation space 120, a coil unit 130, a battery 140, and a controller 150. According to an embodiment, the susceptor 110 may be included in a cigarette 200 (see FIGS. 3 and 4). In this case, the aerosol-generating device 100 may not include the susceptor 110, as illustrated in FIG. 2.

The aerosol-generating device 100 of FIGS. 1 and 2 includes components particularly related to the present embodiment. Therefore, one of ordinary skill in the art could understand that additional components other than the components of FIGS. 1 and 2 may be further included in the aerosol-generating device 100.

The aerosol-generating device 100 may generate aerosols by heating the cigarette 200 accommodated in the aerosol-generating device 100 by an induction heating method. The induction heating method may indicate a method by which a magnetic substance is heated by an external magnetic field. Specifically, a magnetic substance may be heated by an alternating magnetic field that periodically changes its direction.

When an alternating magnetic field is applied to the magnetic substance, energy may be lost in the magnetic substance because of eddy current loss and hysteresis loss, and the lost energy may be emitted from the magnetic substance as heat energy. The greater an amplitude or a frequency of an alternating magnetic field applied to the magnetic substance is, the more heat energy may be emitted from the magnetic substance. The heat energy may be emitted from the magnetic field as the aerosol-generating apparatus 100 applies the alternating magnetic field to the magnetic substance, and the heat energy may be transferred to the cigarette 200.

The magnetic substance heated by the external magnetic field may be the susceptor 110. The susceptor 110 may be in the form of a piece, a flake, or a strip.

The susceptor 110 may include metal or carbon. The susceptor 110 may include at least one of ferrite, ferromagnetic alloy, stainless steel, and aluminum (Al). Also, the susceptor 110 may include at least one of ceramic such as graphite, molybdenum, silicon carbide, niobium, nickel alloy, a metal film, or zirconia, a transition element such as nickel (Ni) or cobalt (Co), and a metalloid such as boron (B) or phosphorus (P).

The aerosol-generating device 100 may include the accommodation space 120 in which the cigarette 200 is accommodated. The accommodation space 120 may include an opening through which the cigarette 200 may be inserted into the accommodation space 120 from the outside of the aerosol-generating device 100.

As illustrated in FIG. 1, the susceptor 110 may be arranged at an inner end portion of the accommodation space 120. The susceptor 110 may be attached to a bottom surface of the accommodation space 120. The cigarette 200 may be pressed down to the bottom surface of the accommodation space 120 such that the susceptor 110 is inserted into the cigarette 200.

Alternatively, as illustrated in FIG. 2, the aerosol-generating device 100 may not include the susceptor 110. In this case, the susceptor 110 may be included in the cigarette 200.

The aerosol-generating device 100 may apply the alternating magnetic field to the susceptor 110 and may include the coil unit 130 that induces the magnetism in the susceptor 110. The coil unit 130 may include at least one coil.

The coil may be a solenoid. In this case, the coil may be wound around the accommodation space 120, and the cigarette 200 may be accommodated in an internal space of the solenoid. A material of a conducting wire forming the solenoid may include copper (Cu). However, the material is not limited thereto. Any material may be used that has low resistance allowing a high current to flow, such as silver (Ag), gold (Au), aluminum (Al), tungsten (W), zinc (Zn), nickel (Ni), or an alloy including at least one of the materials listed above.

The coil may be wound around the accommodation space 120 and may be positioned at a location corresponding to the susceptor 110. The arrangements of the coils will be described below with reference to FIGS. 7A to 7C.

The battery 140 may supply power to the coil unit 130. The battery 140 may be a lithium iron phosphate (LiFePO$_4$) battery, but is not limited thereto. For example, the battery may be a lithium cobalt oxide (LiCoO$_2$) battery, a lithium titanate battery, or the like.

The controller 150 may control the power supplied to the coil unit 130. When the coil unit 130 includes coils, the controller 150 may change an amplitude, a frequency, etc., of an alternating current supplied to the coils. Also, the controller 150 may change a magnitude, etc., of the direct current supplied to the coils.

The controller 150 may control induction heating of the susceptor 110 by controlling the amplitude, the frequency, etc., of the alternating current. Also, the controller 150 may induce the magnetism of the susceptor 110 by controlling a magnitude, etc. of a direct current. The controller 150 may detect a change in the magnetism of the susceptor 110 that is caused by the induction heating and may calculate a temperature of the susceptor 110 according to a detection result. The induction heating method and the temperature calculation method of the controller 150 will be described below with reference to FIG. 8.

Figure 3:
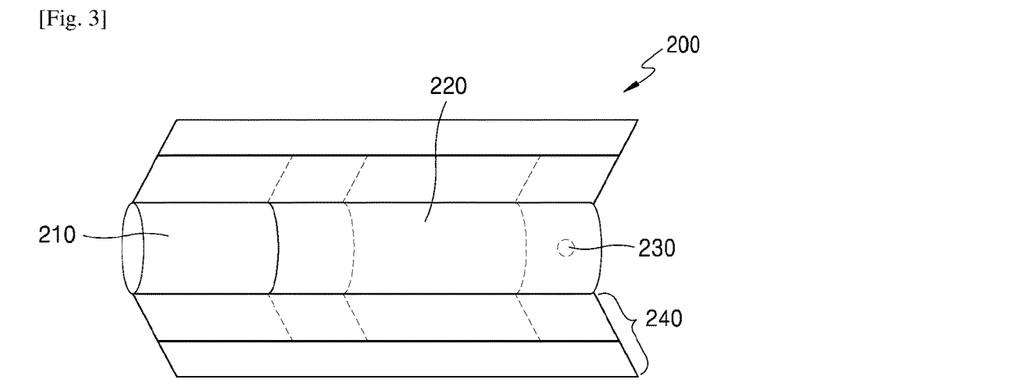
FIGS. 3 and 4 illustrate examples of a cigarette.
Figure 4:
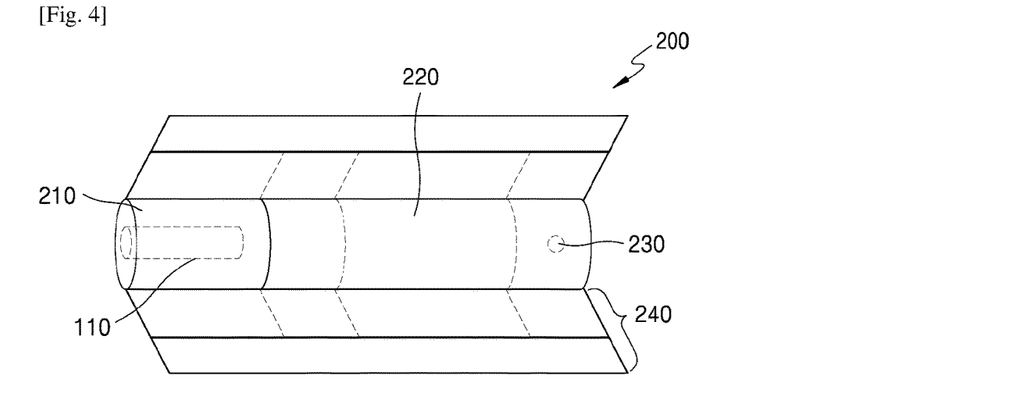

FIGS. 3 and 4 illustrate examples of a cigarette.

Referring to FIGS. 3 and 4, the cigarette 200 may include a tobacco rod 210 and a filter rod 220. FIGS. 3 and 4 illustrate that the filter rod 220 includes a single segment, but the filter rod 220 is not limited thereto. The filter rod 220 may include a plurality of segments. For example, the filter rod 220 may include a first segment configured to cool an aerosol and a second segment configured to filter a certain component included in the aerosol. Also, the filter rod 220 may further include at least one segment configured to perform other functions.

The cigarette 200 may be packaged by at least one wrapper 240. The wrapper 240 may have at least one hole through which external air may be introduced or internal air may be discharged. For example, the cigarette 200 may be packaged by one wrapper 240. As another example, the cigarette 200 may be double-packaged by at least two wrappers 240. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire cigarette 200 may be packaged by a third wrapper.

The tobacco rod 210 may include an aerosol-generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as pipe tobacco, which is formed of tiny bits cut from a tobacco sheet.

According to an embodiment, the cigarette 220 may further include the susceptor 110. In this case, as illustrated in FIG. 4, the susceptor 110 may be arranged on the tobacco rod 210. The susceptor 110 may extend towards the filter rod 220 from an end portion of the tobacco rod 210.

The tobacco rod 210 may be surrounded by a heat conductive material. For example, the heat-conducting material may be, but is not limited to, a metal foil such as an aluminum foil. For example, the heat conductive material surrounding the tobacco rod 210 may uniformly distribute heat transmitted to the tobacco rod 210, and thus, the heat conductivity applied to the tobacco rod may be increased and a flavor of the aerosol generated from the tobacco rod 210 may be improved.

The filter rod 220 may include a cellulose acetate filter. Shapes of the filter rod 220 may vary. For example, the filter rod 220 may include a cylinder-type rod or a tube-type rod having a hollow inside. Also, the filter rod 220 may include a recess-type rod including a cavity inside. When the filter rod 220 includes a plurality of segments, the plurality of segments may have different shapes.

The filter rod 220 may be formed to generate flavors therefrom. For example, a flavoring liquid may be injected onto the filter rod 220, or an additional fiber coated with a flavoring liquid may be inserted into the filter rod 220.

Also, the filter rod 220 may include at least one capsule 230. The capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone. In some embodiments, the cooling segment may include a cellulose acetate filter having a plurality of holes. However, the cooling segment is not limited thereto and may include a configuration, in which an aerosol is cooled, and an aerosol cooling material.

Figure 5:
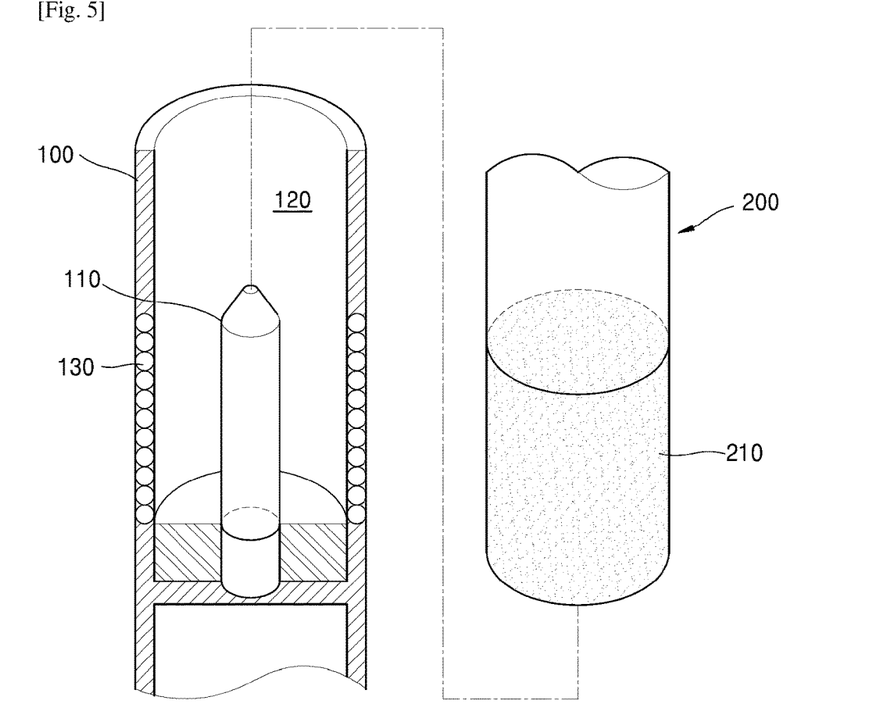
FIGS. 5 and 6 illustrate examples of a cigarette inserted into an aerosol-generating device.
Figure 6:
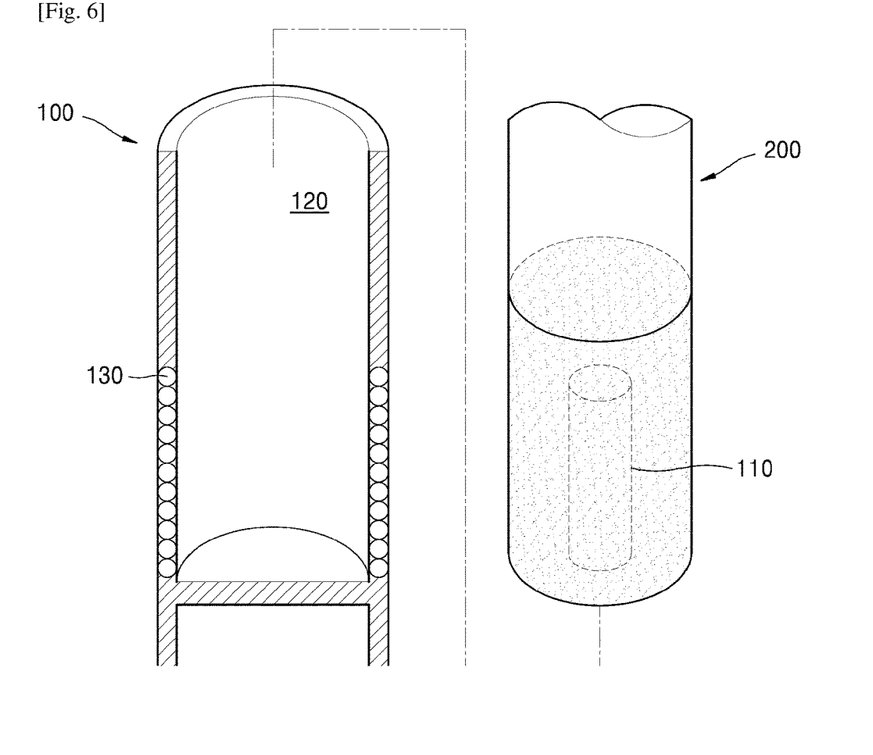

FIGS. 5 and 6 illustrate examples of a cigarette inserted into an aerosol-generating device.

In more detail, FIG. 5 illustrates an example of the cigarette 200 inserted into the aerosol-generating device 100 when the susceptor 110 is arranged in the aerosol-generating device 100, and FIG. 6 illustrates an example of the cigarette 200 inserted into the aerosol-generating device 100 when the susceptor 110 is arranged in the cigarette 200.

Referring to FIG. 5, the cigarette 200 may be pressed into the accommodation space 120 in a lengthwise direction of the cigarette 200. As a result, the susceptor 110 may be inserted into the cigarette 220 accommodated in the aerosol-generating device 100. As the susceptor 110 is inserted into the cigarette 200, the tobacco rod 210 may contact the susceptor 110. The susceptor 110 may extend in a lengthwise direction of the aerosol-generating device 100 such that the susceptor 110 can be easily inserted into the cigarette 200.

The susceptor 110 may be at the center of the accommodation space 120 to be inserted into a central portion of the cigarette 200. FIG. 5 illustrates a single susceptor 110, but the number of susceptors is not limited thereto. In other words, the aerosol-generating device 100 may include multiple susceptors 110 that extend in the lengthwise direction of the aerosol-generating device 100 to be inserted into the cigarette 200 and are arranged in parallel with each other.

The coil unit 130 may include at least one coil, and the coil may be wound around the accommodation space 120 and extend in the lengthwise direction of the accommodation space 120. The length of the coil in the lengthwise direction of the accommodation space 120 may correspond to a length of the susceptor 110 such that the coil may be positioned at a location corresponding to the susceptor 110.

Referring to FIG. 6, the cigarette 200 may be inserted in the accommodation space 120 in a lengthwise direction of the cigarette 200. As the cigarette 200 is accommodated in the accommodation space 120, the susceptor 110 may be surrounded by the coil unit 130.

The susceptor 110 may be at the center of the tobacco rod 210 for uniform heat transmission. FIG. 6 illustrates a single susceptor 110, but the number of susceptors is not limited thereto. In other words, the aerosol-generating device 100 may include a plurality of susceptors 110 included in the cigarette 200.

The coil unit 130 may include at least one coil, and the coil may be wound around the accommodation space 120 and extend in the lengthwise direction of the accommodation space 120. The length of the coil in the lengthwise direction of the accommodation space 120 may correspond to the length of the susceptor 110 such that their positions correspond to each other.

Figure 7A:
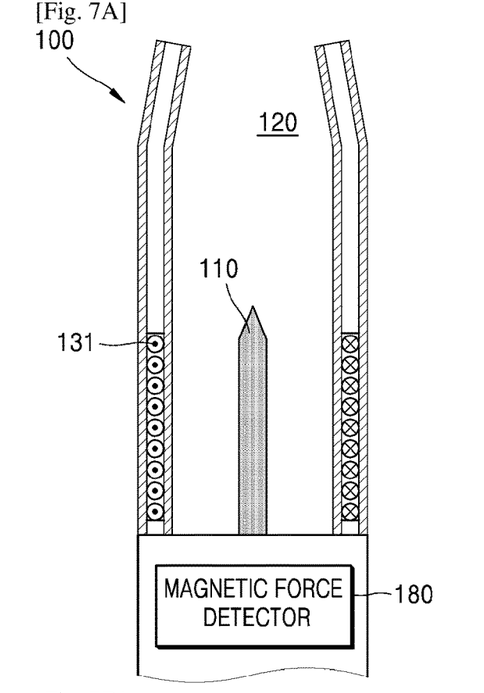
FIGS. 7A to 7C are diagrams for explaining a method of winding coils.
Figure 7B:
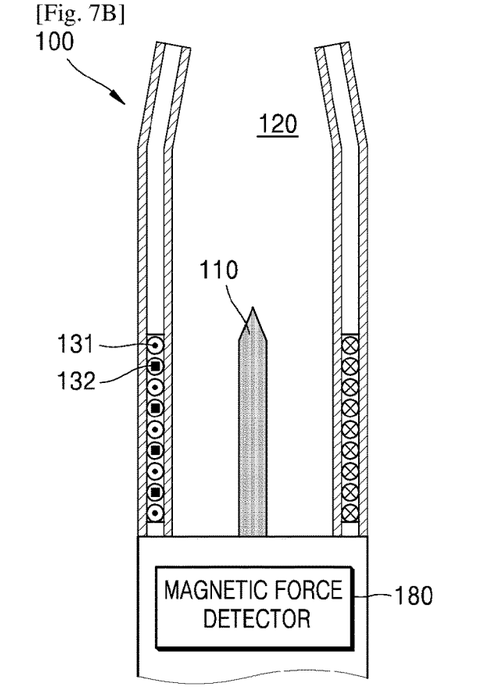
Figure 7C:
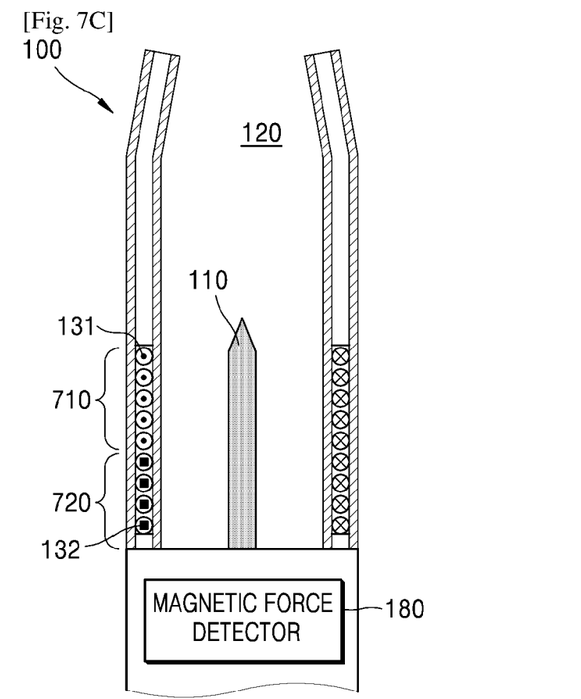

FIGS. 7A to 7C illustrate a winding method of a coil according to different embodiments.

In more detail, FIG. 7A illustrates a method of winding a coil when the coil unit 130 includes only one coil, and FIGS. 7B and 7C illustrate methods of winding coils when the coil unit 130 includes coils.

In FIGS. 7A to 7C, an inner side surface of the accommodation space 120 indicates an area contacting an area where the cigarette 200 is inserted, and an outer side surface of the accommodation space 120 indicates a portion opposite to the inner side surface. Also, the lengthwise direction of the aerosol-generating device 100 may be a direction perpendicular to an end face of an accommodation space 120 where the cigarette 200 is inserted.

In FIG. 7A, the coil unit 130 may include a first coil 131. The first coil 131 may surround the accommodation space 120 such that a length of the first coil 131 in the lengthwise direction of the aerosol-generating device 100 corresponds to a length of the susceptor 110. As illustrated in FIG. 7A, when the aerosol-generating device 100 includes a single coil 131 that heats the susceptor 110 and also measures a temperature of the susceptor 110, the manufacturing process may be simplified.

FIG. 7B illustrates that the coil unit 130 includes a first coil 131 and a second coil 132. The first coil 131 and the second coil 132 may alternately wound around the accommodation space 120 in the lengthwise direction of the aerosol-generating device 100.

As with FIG. 7B, FIG. 7C illustrates that the coil unit 130 includes the first coil 131 and the second coil 132 which are wound around the accommodation space 120. The first coil 131 may be wound in a first area 710, and the second coil 132 may be wound in a second area 720 that is different from the first area 710.

As illustrated in FIGS. 7B and 7C, when the aerosol-generating device 100 includes a plurality of coils 132 and 132, the aerosol-generating device 100 may heat the susceptor 110 through the first coil 131 and may induce the magnetism of the susceptor 110 through the second coil 132. Accordingly, it may improve controllability of the aerosol-generating device 100.

A magnetic force detector 180 may be arranged under the susceptor 110 so that the impact of the magnetic force detector 180 on the induction heating of the first coil 131 is minimized.

Figure 8:
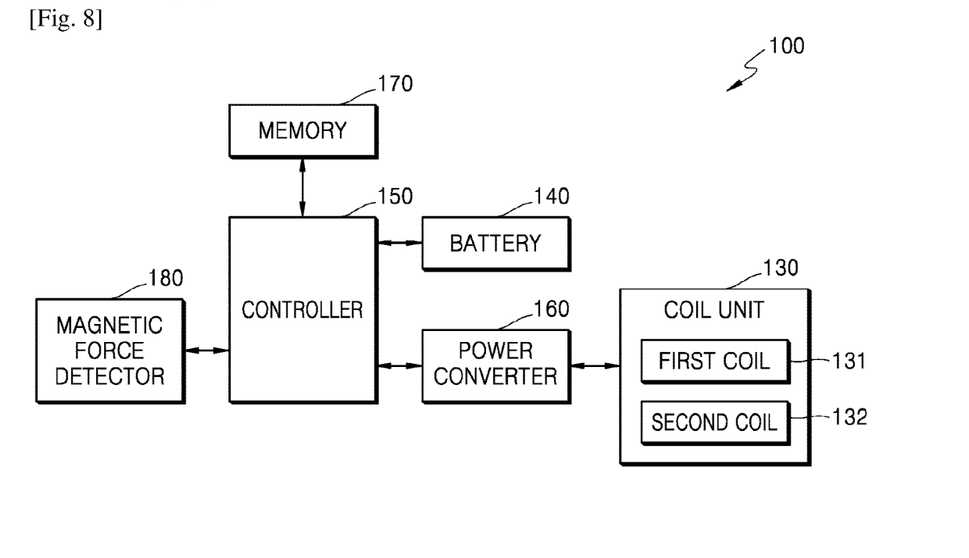
FIG. 8 is a block diagram of an aerosol-generating device according to an embodiment.

FIG. 8 is a block diagram of an aerosol-generating device according to an embodiment.

Referring to FIG. 8, the aerosol-generating device 100 may include the battery 140, a power converter 160, the coil unit 130, a magnetic force detector 180, a memory 170, and a controller 150. The coil unit 130, the battery 140, and the controller 150 of FIG. 8 may respectively correspond to the coil unit 130, the battery 140, and the controller 150 of FIGS. 1 and 2. Also, although not illustrated in FIG. 8, the susceptor 110 may be included in the aerosol-generating device 100.

The battery 140 may supply power to internal components of the aerosol-generating device 100. The battery 140 may supply direct current power. The power converter 160 may covert the direct current power supplied from the battery 140 into alternating current power and transmit the alternating current power to the coil unit 130. Alternatively, the power converter 160 may convert only a magnitude of the direct current power and transmit the direct current power to the coil unit 130.

The coil unit 130 may include at least one coil. In an embodiment, the coil unit 130 may include the first coil 131. In another embodiment, the coil unit 130 may include the first coil 131 and the second coil 132.

The controller 150 may control the power supplied to the coil unit 130. In an embodiment, the controller 150 may heat the susceptor 110 by controlling the alternating current power supplied to the first coil 131. In another embodiment, the controller 150 may heat the susceptor 110 by controlling the alternating current power supplied to the first coil 131 and may induce the magnetism in the susceptor 110 by controlling the direct current power supplied to the first coil 131. In another embodiment, the controller 150 may heat the susceptor 110 by controlling the alternating current power supplied to the first coil 131 and may induce the magnetism in the susceptor 110 by controlling the direct current power supplied to the second coil 132.

An example in which the controller 150 heats the susceptor 110 through the first coil 131 will be described below with reference to FIG. 11, and an example in which the controller 150 heats the susceptor 110 and induces the magnetism in the susceptor 110 through the first coil 131 will be described below with reference to FIGS. 12 and 13. An example in which the controller 150 heats the susceptor 110 through the first coil 131 and induces the magnetism in the susceptor 110 through the second coil 132 will be described below with reference to FIGS. 12 and 14.

The magnetic force detector 180 may detect a change in magnetic force of the susceptor 110. To this end, the magnetic force detector 180 may include at least one hall sensor. The controller 150 may calculate a temperature of the susceptor 110, according to the change in the magnetic force detected by the magnetic force detector 180.

For example, the memory 170 may store a look-up table in which the magnetic force or a change in the magnetic force of the susceptor 110 is associated with the corresponding temperature thereof, and the controller 150 may calculate the temperature of the susceptor 110 based on the look-up table stored in the memory 170.

An internal structure of the aerosol-generating device 100 is not limited to the illustration of FIG. 8. One of ordinary skill in the art could understand that some of hardware components of FIG. 8 may be omitted, or new components may be added, according to a design of the aerosol-generating device 100.

Figure 9:
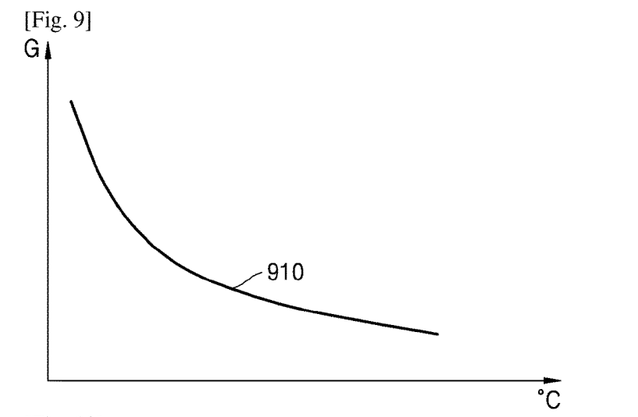
FIG. 9 illustrates a change in magnetic force according to temperature, according to an embodiment.
Figure 10:
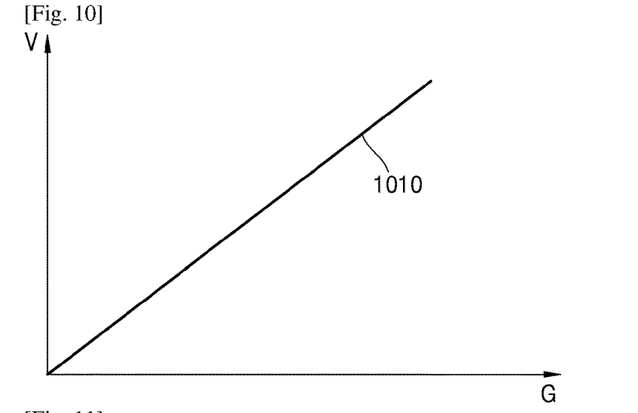
FIG. 10 illustrates an output value of the magnetic force detector according to a magnetic force of a susceptor.

FIG. 9 illustrates a change in magnetic force of the susceptor according to a temperature, and FIG. 10 illustrates an operating method of a magnetic force detector.

FIG. 9 illustrates a graph 910 showing the change in the magnetic force of the susceptor 110 according to the temperature. In FIG. 9, the x axis indicates a temperature, and the y axis indicates a magnetic force.

As illustrated in FIG. 9, as the temperature of the susceptor 110 increases, the magnetic force decreases. The memory 170 may store the graph 910 showing the change in the magnetic force according to the temperature. For example, the memory 170 may store the graph 910 showing the change in the magnetic force in the form of a look-up table.

The magnetic force detector 180 may detect the change in the magnetic force of the susceptor 110. The magnetic force detector 180 may output an output value corresponding to a magnetic force value of the susceptor 110.

FIG. 10 illustrates a graph 1010 showing a relationship between a magnetic force of the susceptor and an output value of the magnetic force detector. In FIG. 10, the x axis indicates magnetic force, and the y axis indicates a voltage.

FIG. 10 illustrates that the output value of the magnetic force detector 180 is represented by voltage, but embodiments are not limited thereto. For example, the output value of the magnetic force detector 180 may be represented by a current, a frequency, or the like.

As illustrated in FIG. 10, as a magnetic force value of the susceptor 110 increases, the output value of the magnetic force detector 180 increases as well. The memory 170 may store data represented by the graph 1010. For example, the memory 170 may store data represented by the graph 1010 in the form of a look-up table.

The controller 150 may receive the output value of the magnetic force detector 180. The controller 150 may obtain the magnetic force value corresponding to the output value, based on the look-up table stored in the memory 170. Also, the controller 150 may obtain temperature information of the susceptor 110 that corresponds to the magnetic force value, based on the look-up table.

Figure 11:
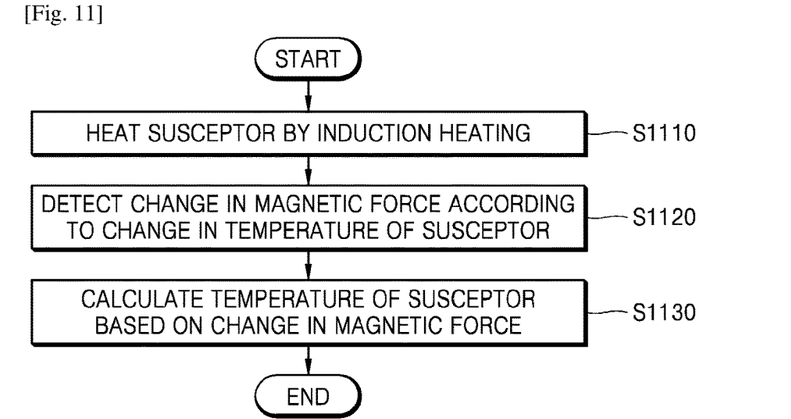
FIG. 11 is a flowchart of an operating method of an aerosol-generating device, according to an embodiment.

FIG. 11 is a flowchart of an operating method of an aerosol-generating device, according to an embodiment.

In more detail, FIG. 11 is a flowchart for explaining a method of detecting the temperature of the susceptor 110 according to the change in the magnetic force of the susceptor 110 when the susceptor 110 includes a permanent magnet. Referring to FIG. 11, the susceptor 110 includes the permanent magnet, and thus, there is no need to induce the magnetism in the susceptor 110. In other words, the first coil 131 is only used to heat the susceptor 110. Therefore, for convenience of explanation, the first coil 131 will be referred to as a coil 131.

Referring to FIG. 11, in operation S1110, the controller 150 may heat the susceptor 110 by induction heating. The susceptor 110 may be included in an aerosol-generating substrate and/or the aerosol-generating device 100. The aerosol-generating substrate may be the cigarette 200 of FIGS. 3 and 4. For example, the susceptor 110 may be formed of a permanent magnet material.

The controller 150 may control an alternating current supplied to the coil 131. When the alternating current is supplied to the coil 131, a direction of a magnetic field formed inside the coil 131 may periodically change. When the susceptor 110 is exposed to an alternating magnetic field formed by the coil 131, the susceptor 110 may be heated by induction heating.

The controller 150 may control the temperature of the susceptor 110 by adjusting an amplitude, a frequency, etc., of the alternating current supplied to the coil 131 according to a preset temperature profile.

In operation S1120, the magnetic force detector 180 may detect the change in the magnetic force according to the temperature of the susceptor 110.

In an embodiment, the magnetic force detector 180 may convert the magnetic force value corresponding to a temperature value of the susceptor 110 into a voltage and may output the voltage.

In operation S1130, the controller 150 may calculate the temperature of the susceptor 110, based on the change in the magnetic force.

For example, the controller 150 may obtain, from the look-up table stored in the memory 170, the temperature of the susceptor 110 that corresponds to the output value output from the magnetic force detector 180. As another example, the controller 150 may obtain a difference between a first magnetic force value of the susceptor 110 detected at a first time point and a second magnetic force value at a second time point. Then, the controller 150 may obtain the temperature of the susceptor 110 that corresponds to the difference between the first and second magnetic force values from the look-up table stored in the memory 170.

In FIG. 11, because the susceptor 110 is formed of the permanent magnet material, the susceptor 110 has its own magnetism. Therefore, there is no need for the controller 150 of FIG. 11 to induce the magnetism to the susceptor 110. Accordingly, design and control of the aerosol-generating device 100 may be simplified.

On the other hand, when the susceptor 110 is limited to the permanent magnet, there could be some limitations on the design of the susceptor 110 because of electrical or mechanical properties of the permanent magnet. According to an embodiment where the susceptor 110 is not a permanent magnet, the aerosol-generating device 100 may induce the magnetism to the susceptor 110, and the temperature of the susceptor 110 may be measured based on the induced magnetism.

Hereinafter, a method of measuring the temperature of the susceptor 110 when the susceptor 110 is not the permanent magnet will be described.

Figure 12:
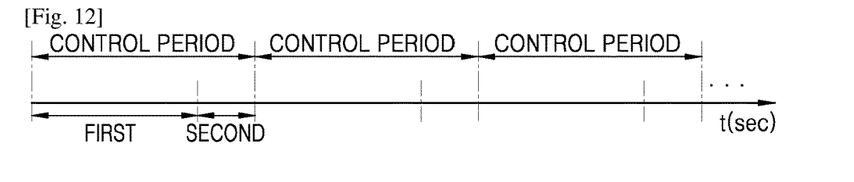
FIG. 12 is a diagram showing a control period of a coil, according to an embodiment.

FIG. 12 is a diagram showing a control period of a coil according to an embodiment.

In FIG. 12, the controller 150 may control the coil unit 130 based on a preset control period. Each control period may include a first section, in which the susceptor 110 is heated, and a second section, in which the magnetism is induced in the susceptor 110. The controller 150 may heat the susceptor 110 in the first section and calculate the temperature of the susceptor 110 in the second section.

The controller 150 may heat the susceptor 110 and induce the magnetism in the susceptor 110 by using the first coil 131. Alternatively, the controller 150 may heat the susceptor 110 by using the first coil 131 and may induce the magnetism in the susceptor 110 by using the second coil 132. A method of measuring the temperature of the susceptor 110 by using the same coil 131 will be described below with reference to FIG. 13, and a method of measuring the temperature of the susceptor 110 by using the first coil 131 and the second coil 132 will be described with reference to FIG. 14.

Figure 13:
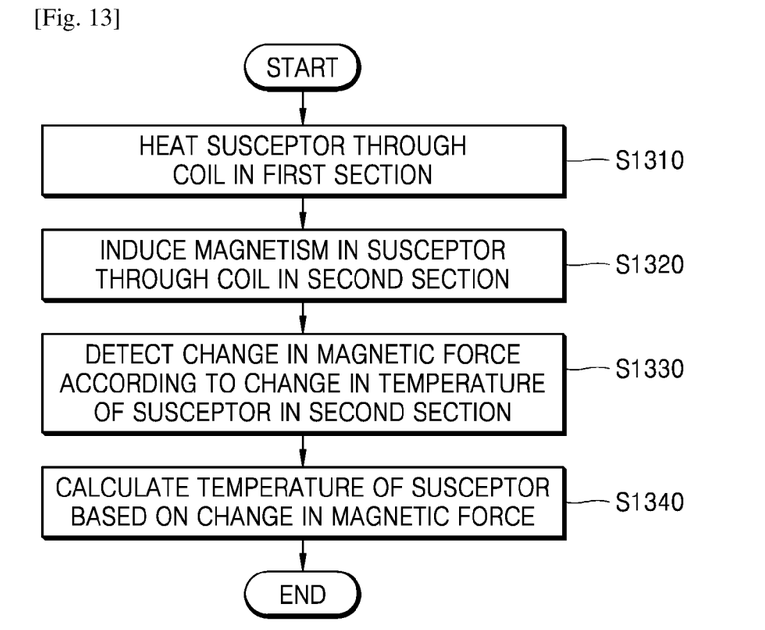
FIG. 13 is a flowchart for explaining an operating method of an aerosol-generating device, according to an embodiment.

FIG. 13 is a flowchart for explaining an operating method of an aerosol-generating device, according to an embodiment.

In more detail, FIG. 13 is a flowchart for explaining a method of measuring the temperature of the susceptor 110 by using the first coil 131 only. Referring to FIG. 13, the temperature of the susceptor 110 is measured by using the first coil 131 only, and thus, the second coil 132 is not required. Therefore, in FIG. 13, the first coil 131 will be referred to as the coil 131.

Referring to FIG. 13, in operation S1310, the controller 150 may heat the susceptor 110 by using the coil 131 in the first section. A method of heating the susceptor 110 by using the coil 131 in the first section may be identical to that of FIG. 11. In other words, the controller 150 may control the alternating current supplied to the coil 131 in the first section. When the alternating current is supplied to the coil 131, a direction of the magnetic field formed inside the coil 131 may periodically change. When the susceptor 110 is exposed to the alternating magnetic field formed by the coil 131, the susceptor 110 may be heated by eddy currents induced in the susceptor 110. According to embodiments, the susceptor 110 may be arranged in the aerosol-generating substrate and/or the aerosol-generating device 100.

The controller 150 may change the amplitude, the frequency, or the like of the alternating current supplied to the coil 131 according to a preset temperature profile, thereby controlling the temperature of the susceptor 110.

In operation S1320, the controller 150 may induce the magnetism in the susceptor 110 by using the coil 131 in the second section.

The controller 150 may control the direct current supplied to the coil 131 in the second section. When the direct current is supplied to the coil 131, a magnetic field may be formed outside the coil 131. When the susceptor 110 is exposed to the magnetic field, a magnetic moment reacts inside the susceptor 110, and thus, the susceptor 110 may be magnetized.

In operation S1330, the magnetic force detector 180 may detect a change in magnetic force according to a temperature change of the susceptor 110 in the second section.

A method of detecting the magnetic force of the susceptor 110 in the second section may be identical to that of FIG. 11. In other words, the magnetic force detector 180 may convert the magnetic force value corresponding to the temperature value of the susceptor 110 into the voltage and may output the voltage.

The first section may be longer than the second section. In this case, the temperature change of the susceptor 110 may be minimized and the temperature of the susceptor 110 may be measured accurately.

In operation S1340, the controller 150 may calculate the temperature of the susceptor 110 based on the change in the magnetic force.

A method of calculating the temperature of the controller 150 in the second section may be identical to that of FIG. 11. In other words, the controller 150 may obtain the temperature of the susceptor 110 that corresponds to the output value output by the magnetic force detector 180 from the look-up table stored in the memory 170. As another example, the controller 150 may obtain a difference between a first magnetic force value of the susceptor 110 detected at a first point in time and a second magnetic force value detected at a second point in time. Also, the controller 150 may obtain, from the look-up table stored in the memory 170, the temperature of the susceptor 110 that corresponds to the difference between the first and second magnetic force values.

Figure 14:
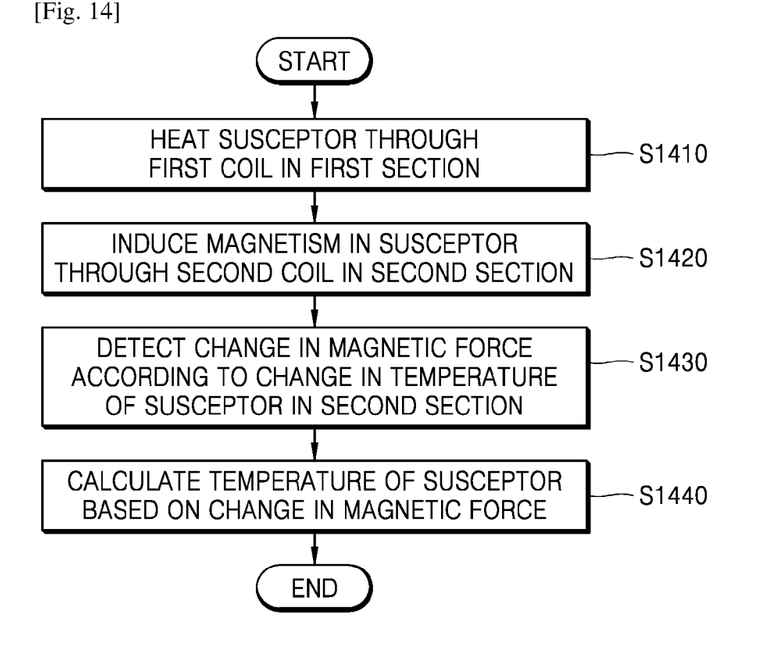
FIG. 14 is a flowchart for explaining an operating method of an aerosol-generating device, according to an embodiment.

FIG. 14 is a flowchart for explaining an operating method of an aerosol-generating device, according to an embodiment.

In more detail, FIG. 14 is a flowchart for explaining the method of measuring the temperature of the susceptor 110 through the first coil 131 and the second coil 132.

Referring to FIG. 14, in operation S1410, the controller 150 may heat the susceptor 110 through the first coil 131 in the first section. A method of heating the susceptor 110 through the first coil 131 in the first section may be identical to that of FIG. 11. In other words, the controller 150 may control the alternating current supplied to the first coil 131 in the first section. When the alternating current is supplied to the first coil 131, the direction of the magnetic field formed inside the first coil 131 may periodically change. When the susceptor 110 is exposed to the alternating magnetic field formed by the first coil 131, the susceptor 110 may be heated by eddy currents induced in the susceptor 110. According to embodiments, the susceptor 110 may be arranged in the aerosol-generating substrate and/or the aerosol-generating device 100.

The controller 150 may vary an amplitude, a frequency, etc., of the alternating current supplied to the first coil 131 according to a preset temperature profile, and thus, the temperature of the susceptor 110 may be controlled.

In operation S1420, the controller 150 may induce the magnetism in the susceptor 110 through the second coil 132 in the second section.

The controller 150 may control the direct current supplied to the second coil 132 in the second section. In the second section, the controller 150 may not supply the power to the first coil 131. When the direct current is supplied to the second coil 132, a magnetic field may be generated outside the second coil 132. When the susceptor 110 is exposed to the magnetic field, a magnetic moment reacts in the susceptor 110, and thus, the susceptor 110 may be magnetized.

In operation S1430, the magnetic force detector 180 may detect the change in the magnetic force of the susceptor 110 according to the temperature change thereof in the second section.

A method of detecting the magnetic force of the susceptor 110 in the second section may be identical to that of FIG. 11. In other words, the magnetic force detector 180 may convert the magnetic force value, which corresponds to the temperature value of the susceptor 110, into the voltage and may output the voltage.

The first section may be longer than that of the second section. In this case, the temperature change of the susceptor 110 may be minimized and the temperature of the susceptor 110 may be measured accurately.

In operation S1440, the controller 150 may calculate the temperature of the susceptor 110 based on the change in the magnetic force.

A method of calculating the temperature of the controller 150 in the second section may be identical to that of FIG. 11. In other words, the controller 150 may obtain, from the look-up table stored in the memory 170, the temperature of the susceptor 110 that corresponds to the output value output by the magnetic force detector 180. As another example, the controller 150 may obtain the difference between the first magnetic force value of the susceptor 110 detected at the first point in time and the second magnetic force value detected at the second point in time. Also, the controller 150 may obtain the temperature of the susceptor 110 that corresponds to the magnetic force value, from the look-up table stored in the memory 170.

At least one of the components, elements, modules or units (collectively "components" in this paragraph) represented by a block in the drawings, such as the controller 150, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art pertaining to the present embodiments can understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol-generating device comprising:
   a susceptor arranged to be inserted into an aerosol-generating substrate;
   a coil configured to heat the susceptor by induction heating;
   a magnetic force detector configured to detect a change in magnetic force of the susceptor according to a temperature change; and
   a controller configured to calculate a temperature of the susceptor based on the change in the magnetic force detected by the magnetic force detector.

2. The aerosol-generating device of claim 1, wherein the susceptor comprises a permanent magnet material and protrudes in an accommodation space in which the aerosol-generating substrate is accommodated.

3. The aerosol-generating device of claim 1, wherein the coil surrounds an accommodation space for accommodating the aerosol-generating substrate, and is wound to extend in a lengthwise direction of the accommodation space.

4. An aerosol-generating device comprising:
   a susceptor arranged to be inserted into an aerosol-generating substrate;
   a coil configured to heat the susceptor by induction heating and induce magnetism in the susceptor;
   a magnetic force detector configured to detect a change in magnetic force of the susceptor according to a temperature change; and
   a controller configured to calculate a temperature of the susceptor based on the change in the magnetic force detected by the magnetic force detector.

5. The aerosol-generating device of claim 4, wherein
   the controller is configured to control the coil in a preset control period and
   the preset control period comprises a first section in which the susceptor is heated, and a second section in which the magnetism is induced in the susceptor.

6. The aerosol-generating device of claim 5, wherein the controller is configured to calculate the temperature of the susceptor based on the change in the magnetic force detected by the magnetic force detector in the second section.

7. The aerosol-generating device of claim 4, wherein
   the susceptor protrudes in an accommodation space for accommodating the aerosol-generating substrate, and
   the coil surrounds the accommodation space.

* * * * *